United States Patent
Abell

(10) Patent No.: US 9,852,468 B2
(45) Date of Patent: Dec. 26, 2017

(54) ELECTRONIC SHELF SYSTEM WITH MOBILE DEVICE INTERACTIVITY AND PRINTED PLASTIC DISPLAY

(71) Applicant: Trius Retail LLC, Nashua, NH (US)

(72) Inventor: Peter B. Abell, Nashua, NH (US)

(73) Assignee: Trius Retail LLC, Bradenton, FL (US)

( * ) Notice: Subject to any disclaimer, the term of this patent is extended or adjusted under 35 U.S.C. 154(b) by 639 days.

(21) Appl. No.: 14/446,087

(22) Filed: Jul. 29, 2014

(65) Prior Publication Data

US 2016/0035012 A1    Feb. 4, 2016

(51) Int. Cl.

| | | |
|---|---|---|
| G06Q 30/00 | (2012.01) | |
| G06F 3/00 | (2006.01) | |
| G06Q 10/00 | (2012.01) | |
| G06Q 30/06 | (2012.01) | |
| G06F 3/147 | (2006.01) | |
| G06Q 10/08 | (2012.01) | |
| G06Q 30/02 | (2012.01) | |

(52) U.S. Cl.
CPC ......... *G06Q 30/0641* (2013.01); *G06F 3/147* (2013.01); *G06Q 10/087* (2013.01); *G06Q 30/02* (2013.01)

(58) Field of Classification Search
CPC .. G06Q 30/02; G06Q 10/087; G06Q 30/0641; G06F 3/147
See application file for complete search history.

(56) References Cited

U.S. PATENT DOCUMENTS

| 2005/0237153 | A1* | 10/2005 | Chen | G06Q 30/06 340/5.91 |
|---|---|---|---|---|
| 2012/0120327 | A1* | 5/2012 | Marx | G06F 3/147 348/840 |
| 2012/0310744 | A1* | 12/2012 | Kim | G06Q 30/02 705/14.65 |
| 2014/0210692 | A1* | 7/2014 | Waters | G06F 3/147 345/2.3 |

OTHER PUBLICATIONS

Demla, Anita, et al., "Point of Purchase Advertising Deck" Point of Purchase Advertising, http://www.slideshare.net/slickchickit/finaldeck, Feb. 3, 2012 (6 pages).*

* cited by examiner

*Primary Examiner* — Michael Misiaszek
*Assistant Examiner* — Matthew W Todd
(74) *Attorney, Agent, or Firm* — Perkins Coie LLP

(57) ABSTRACT

The technology described herein includes an automated, customer-based retail display system with mobile device interactivity and a printed plastic display. In some embodiments, a system is described including an electronic shelf display strip that extends along the front edge of existing store shelves. The electronic shelf display strip can be printed on a plastic backplane and designed to fit in standard store shelf pricing areas. The printed electronic display on plastic is low cost and protected from damage as opposed to glass based screens used in prior art electronic shelf labels.

15 Claims, 9 Drawing Sheets

ELECTRONIC SHELF SYSTEM WITH MOBILE DEVICE INTERACTIVITY AND PRINTED PLASTIC DISPLAY

BACKGROUND

Today, product data and pricing information at retail store locations are typically updated manually. For example, at many retail stores such as large grocery chains, in-store systems (e.g., point-of-sale (POS) systems) receive price changes in batch files from a central retailer system on a per department basis (e.g., grocery, dairy, produce, etc.). Paper or plastic price labels are then shipped to the store, often with the products or inventory from the central warehouse. The various departments are then responsible for putting up and/or otherwise displaying the new price labels and/or promotional signs for customers. Once displayed, a responsible party from the department can input a command to the in-store system for the system to update the prices and/or promotions for the department. Unfortunately, this manual process for updating in-store systems with pricing and promotional information is time consuming, relatively static and subject to inaccuracies and fines.

In recent years, efforts have been made to automate the process for updating in-store systems with pricing and/or promotional information. For the most part these efforts have been unsuccessful as they often require major investments in equipment and proprietary communication technologies, as well as costly infrastructure (e.g., power) upgrades. Consequently, few, if any, of these automated system have been adopted on a large scale.

Overall, the examples herein of some prior or related systems and their associated limitations are intended to be illustrative and not exclusive. Other limitations of existing or prior systems will become apparent to those of skill in the art upon reading the following.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
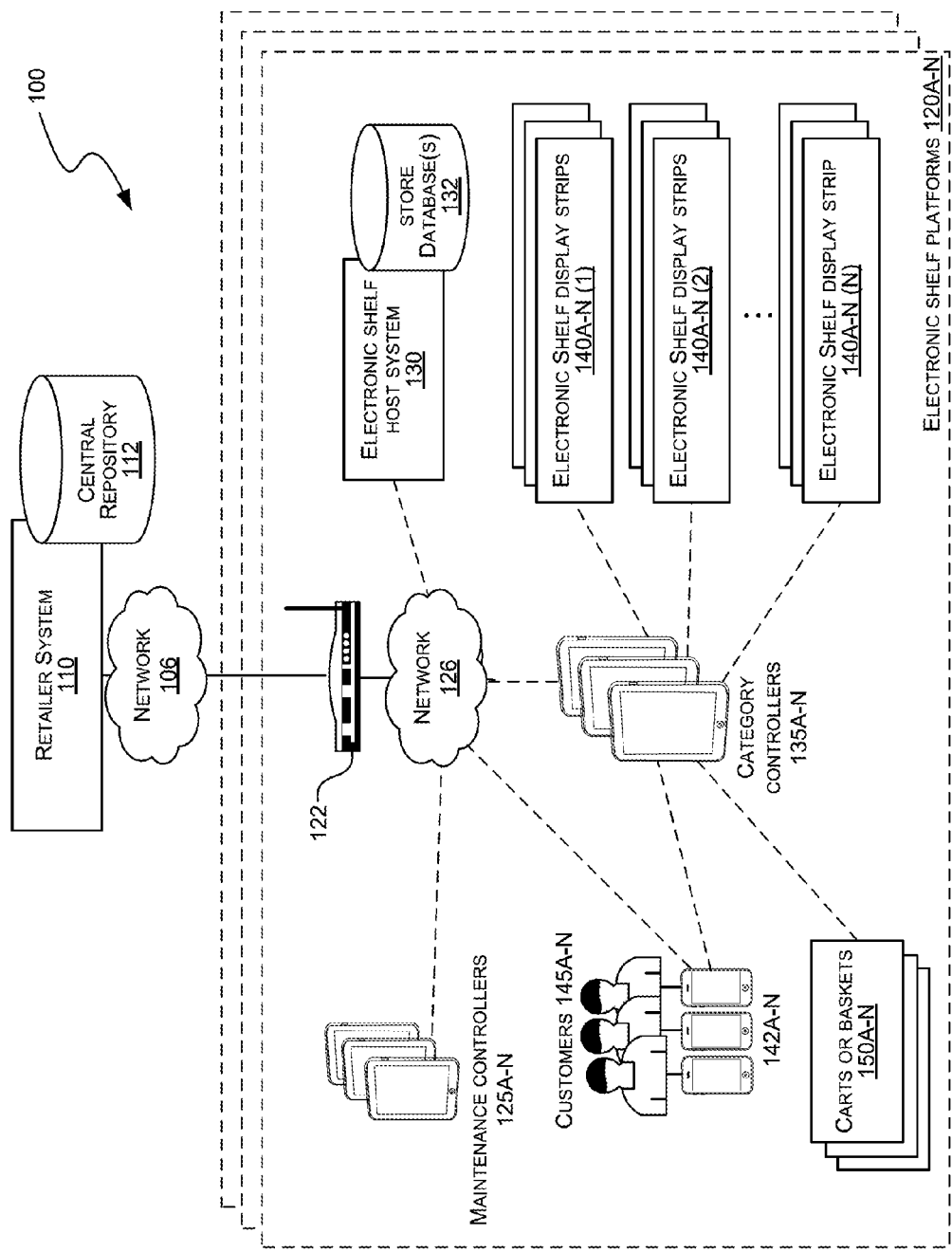
FIG. 1 is a block diagram illustrating an example environment in which electronic shelf platforms facilitate various automated customer-based shelf display technologies.

The following description and drawings are illustrative and are not to be construed as limiting. Numerous specific details are described to provide a thorough understanding of the disclosure. However, in certain instances, well-known or conventional details are not described in order to avoid obscuring the description. References to "one" or "an" embodiment in the present disclosure can be, but not necessarily are, references to the same embodiment, and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art within the context of the disclosure and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of the reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Embodiments of the present disclosure describe an automated, customer-based retail display system with mobile device interactivity and a printed plastic display.

In some embodiments, a system is described including an electronic shelf display strip that extends along the front edge of existing store shelves. The electronic shelf display strip can be printed on a plastic backplane and designed to fit in standard store shelf pricing areas. The printed electronic display on plastic is low cost and protected from damage as opposed to glass-based screens used in prior art electronic shelf labels. Additionally, the electronic shelf display strip can be flexible allow it to curve on curved shelves when in use.

In some embodiments, a system is described that includes multiple electronic shelf display strips that are driven by adjacent category controllers in communication with the electronic shelf display strips and an electronic shelf host system (i.e., in-store server) via one or more first wired or wireless communication links (e.g., wireless personal area network (WPAN) such as Bluetooth, Zigbee, RFID etc.). The category controllers are also in communication with an electronic shelf host system via second wired or a wireless communication links (e.g., wireless local area network (WLAN) such as Wi-Fi, etc.). The communication links with the electronic shelf host system allow the merchant to automatically change/update prices for all products/items in the store. For example, the merchant can dynamically control the displays on the category controllers as well as the displays on the adjacent electronic shelf display strips. In some embodiments, the category controllers can also dynamically control standalone electronic shelf display strips (or labels) where, for example, free-standing areas or temporary areas are set up. The free-standing or temporary areas can be designed with or without typical shelving, the corresponding electronic shelf display strips attached thereto are controllable either way.

In some embodiments, the category controllers can be used to identify uniquely identifiable shopping carts or baskets, or mobile devices, that are nearby or otherwise proximate to the category controllers. The category controllers can use the customer identity information to drive the location-based shelf display technologies described herein. For example, a category controller can use the location or proximity information to identify the unique customer and control what is displayed on the display of the category controller as well as what is displayed on the adjacent electronic shelf display strips driven by the category controller based on the customer identity.

In some embodiments, the category controllers can report the tracking information (e.g., how long carts pause at each location) to the electronic shelf host system where it can be aggregated and/or otherwise analyzed and sent on to the central retailer system. The central retailer system and/or the electronic shelf host system can network with point of sale devices, inventory management systems, etc. to provide better store layouts, efficient shelf stocking, better customer loyalty programs, on demand labor scheduling for the checkout areas, improved marketing, etc., based on the tracking information.

In some embodiments, the technology described herein resolves the issues of the prior art systems by describing a cost-efficient system for providing customer location-based shelf display technologies using commercially (or close to commercially) available technology and an existing power infrastructure. This technology avoids the various issues with prior technology including major investments in proprietary communications technology and costly power infrastructure build out, yet allows for store-wide communication to areas of the store where price and product descriptions are needed. For example, power can be supplied to both the category controller and/or the electronic shelf display strips through normal power, which reduces costs in that no additional power infrastructure or batteries are required and full-motion video can operate without power management concerns.

Although the examples described herein are primarily directed to grocery store retailers, it is appreciated that the technology can be equally applicable to any retailer.

FIG. 1 is a block diagram illustrating an example environment 100 in which electronic shelf platforms 120A-N facilitate various automated customer-based shelf display technologies. In the example of FIG. 1, the example environment 100 includes a central retailer system 110 having a central repository 112 in communication with one or more electronic shelf platforms 120A-N over network 106. Each of the electronic shelf platforms 120A-N is located within a retail store or premises and includes an access point 122 at the retail store or premises in communication with the retailer system 110. The access point 122 generates a local area network 126 over which an electronic shelf host system 130, multiple category controllers 135A-N, and one or more maintenance controllers 125A-N are in communication. Each of the category controllers 135A-N controls display of multiple adjacent electronic shelf display strips 140A-N over wired or wireless communication links. Additionally, the category controllers 135A-N can track customer locations within a merchant location or premises via customer trackable devices. As described herein, the customer trackable devices can be the customers' 145A-N mobile devices, 142A-N, and/or carts or baskets 150A-N.

In some embodiments, the customer trackable devices (e.g., the mobile devices 142A-N and/or carts or baskets 150A-N) include tracking technology (e.g., RFID, Bluetooth, Zigbee, etc.) to facilitate the tracking. For example, when a trackable device is proximate to a category controller, the category controller can establish a communication link with the trackable device. Thus, at any given time, each category controller 135A-N can be in communication with one or more client (or mobile) devices 142A-N or carts/baskets 150A-N.

The electronic shelf host system 130 can be any system and/or device, and/or any combination of devices/systems that is able to communicate with the retailer system 110 and category controllers 135A-N in order to facilitate various automated customer-based shelf display technologies described herein. For example, the electronic shelf host system 130 can receive and store product information from the retailer (e.g., advertising information, price changes, plan-o-gram changes, etc.), receive and store tracking information (e.g., which customers are proximate to which category controllers and for how long) and customer profile information (e.g., input provided by customers about preferences, etc.) from the category controllers, and disseminate product information and profile information to the category controllers which, in turn, detect the proximate customers and drive (e.g., provide data or display images) the electronic shelf display strips 140A-N based on the proximate customers. The electronic shelf host system 130 can be, but is not limited to, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. In the example of FIG. 1, the electronic shelf host system 130 is illustrated as a discrete component; however, the electronic shelf host system 130 can be physically and/or functionally distributed.

As discussed, in some embodiments, the electronic shelf host system 130 distributes new information, e.g., advertising information, price changes, plan-o-gram changes, etc. to the category controllers 135A-N for display on the category controllers themselves and/or for display on adjacent electronic shelf display strips 140A-N driven by the category controllers 135A-N.

In some embodiments, the electronic shelf host system 130 also receives the tracking data from the category controller (e.g., which cart/handbasket tags were near a category or end aisle display and/or for how many seconds, etc.). Tracking can include time stamps and can be collected by the electronic shelf host system 130 for billing and/or pattern tracking purposes. Additionally, the tracking information can be collected and/or aggregated by the electronic shelf host system 130 and sent to the retailer system 110. This data can include which advertisements were running at specific times as well as which products or items were or were not bought when a particular advertisement was running. This information can be, for example, useful to the retailer system 110 in performing various analytics such as determining which promotions or advertisements are the most effective at one store and replicating that to other stores. This information can be applicable to, for example, consumer packaged goods advertising, marketing and promotion groups, etc.

In some embodiments, every merchant retail store location includes an electronic shelf host system 130 (or dual systems for redundancy). The electronic shelf host system 130 operates to receive product data (i.e., pricing data, product information, and product space data) from the retailer system 110 and/or central repository 112 and disseminates the information to the appropriate category controllers 135A-N dispersed throughout the store. The electronic shelf host system 130 can communicate with the category controllers 135A-N via wired or wireless connections. As shown in the example of FIG. 1, the electronic shelf host system 130 communicates with the category controllers 135A-N via network 126. The network 126 can be a local area wireless network (e.g., Wi-Fi network).

In some embodiments, the network 126 uses appropriate encryption technology and operates at speeds (or bandwidths) capable of supporting all system functionality described herein including various maintenance and store supervisory control.

The category controllers 135A-N can be any systems and/or devices, and/or any combination of devices/systems that are able to establish a connection with another device (e.g., customer trackable devices), a server (e.g., electronic shelf host system 130) and/or other systems within the electronic shelf platforms 120A-N. The category controllers 135A-N typically include a display or other output functionalities to present data (e.g., coupons, preference entry interface, etc.) to customers and touchscreen or other input functionalities to receive data (e.g., preferences) from customers. For example, the category controllers 135A-N can be, but are not limited to, off-the-shelf tablet computer devices. The category controllers 135A-N can be connected to the electronic shelf host system 130 via any network. As shown, the category controllers 135A-N are in communication with the electronic shelf host system 130 via the local area wireless network 126. However, in some embodiments, some or all of the category controllers 135A-N may be directly connected to one another and/or the electronic shelf host system 130.

In some embodiments, each of the category controllers 135A-N provide customers with a touch screen as the way in which a consumer can establish their individual preferences and/or profile. The individual preferences provide a way for consumers to indicate preferences on the types of products or items that the customer would like to purchase. The category controllers 135A-N can use this information to drive the displays on multiple adjacent electronic shelf display strips 140A-N over wired or wireless communication links. The communication links can be wireless personal area network (WPAN) links such as, for example, Bluetooth, Zigbee, etc. As discussed herein, preferences can be entered via any of the category controllers and/or via a customer's mobile device (e.g., mobile device 142A-N). Additionally, in some embodiments, the preferences can also be entered via a retailer website or another 3rd party website and downloaded to the customer's mobile device.

By way of example and not limitation, the customer preferences and/or profile information can include product preferences such as, for example, low sodium, gluten free, low cholesterol, etc. Additionally, the customer preference information can include information about the customer such as, for example, allergies or medications, etc. The system can use this information to direct the customer to particular products. For example, the system can attempt to warn customer about foods or supplements that interact poorly with or can enhance their medications. An example of the touch screen display is shown and discussed in greater detail with reference to FIGS. 6 and 7.

In some embodiments, the category controllers 135A-N are configured to track customers via customer trackable devices. As described herein, the customer trackable devices can be the customers' mobile device 142A-N and/or carts or baskets 150A-N. In some embodiments, the carts or baskets 150A-N include tags to facilitate the tracking, RFID, ZigBee, BLE etc.

As discussed, in some embodiments, the electronic shelf host system 130 distributes new information (e.g., advertising information, price changes, plan-o-gram changes, etc.) to the category controllers 135A-N for display on the category controllers 135A-N themselves and/or for display on adjacent electronic shelf display strips 140A-N driven by the category controllers 135A-N.

The customer mobile devices 142A-N can be any system and/or device, and/or any combination of devices/systems that can establish a connection with another device, a server and/or other systems within the network-based environment 100. The customer mobile devices 142A-N typically include display or other output functionalities to present data exchanged between the devices to a user. For example, the customer mobile devices 142A-N can be, but are not limited to, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. The customer mobile devices 142A-N can also be any wearable device such as watches, necklaces, rings or even devices embedded on or within the customer. As shown in the example of FIG. 1, the customer mobile devices 142A-N are directly connected to category controllers 135A-N. However, in some embodiments, the customer mobile devices 142A-N can, alternatively or additionally, be coupled to the network 106 and/or network 126.

As discussed above, in some embodiments, when mobile devices are introduced, the consumer can provide and/or otherwise input their customer preferences using their home computing device (not shown) or mobile device via the web or on their mobile device via the application.

Additionally, in some embodiments, the customer can provide their customer preferences by accessing a retailer website. The website (not shown) can be hosted by one or more servers of the retailer system 110. Alternatively or additionally, some or all of the website can be hosted by one or more third-party web servers.

In some embodiments, a customer with the mobile device application and their preferences established can "opt-in" when entering the store. As the customer approaches a category, the Bluetooth within the display will connect with the Bluetooth in the mobile device establishing a one-to-one connection. It is appreciated that this connection can also be accomplished via other means including Wi-Fi and/or in conjunction with a tag on a hand basket or grocery cart. This allows the category display, and the electronic shelf strips, to immediately show the items which meet the customer's criteria. Additionally, certain customers may wish to be notified via their name or phone number that this is occurring so that it does not annoy them and confirm that any highlighted products are their informed choices versus another consumer nearby. Once the customer selects their items a time limit is established and the displays go back to normal.

The network 106, over which the retailer system 110 and the electronic shelf platforms 120A-N communicate, may be a telephonic network, an open network, such as the Internet, or a private network, such as an intranet and/or the extranet. For example, the Internet can provide file transfer, remote log in, email, news, RSS, and other services through any known or convenient protocol, such as, but not limited to, the TCP/IP protocol, Open System Interconnections (OSI), FTP, UPnP, iSCSI, NSF, ISDN, PDH, RS-232, SDH, SONET, etc. The network 106 can be any collection of distinct networks operating wholly or partially in conjunction to provide connectivity to the retailer system 110 and the electronic shelf platforms 120A-N and may appear as one or more networks to the serviced systems and devices. In one embodiment, communications to and from the retailer system 110 and the electronic shelf platforms 120A-N can be achieved by an open network such as the Internet, or a private network, such as an intranet and/or extranet. In one embodiment, communications can be achieved by a secure communications protocol, such as secure sockets layer (SSL) or transport layer security (TLS).

In addition, communications can be achieved via one or more wireless networks, such as, but not limited to, one or more of a Local Area Network (LAN), Wireless Local Area Network (WLAN), a Personal Area Network (PAN), a Campus Area Network (CAN), a Metropolitan Area Network (MAN), a Wide Area Network (WAN), a Wireless Wide Area Network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G networks, Enhanced Data rates for GSM Evolution (EDGE), General Packet Radio Service (GPRS), enhanced GPRS, messaging protocols such as TCP/IP, SMS, MMS, Extensible Messaging and Presence Protocol (XMPP), Real Time Messaging Protocol (RTMP), Instant Messaging and Presence Protocol (IMPP), instant messaging, USSD, IRC, or any other wireless data networks or messaging protocols.

In some embodiments, the electronic shelf platforms 120A-N provide at least product information from the retailer and tracking information and customer profile information from the category controllers to be stored in one or more databases 132 and can retrieve the data stored in the databases for providing to the various category controllers 135A-N. Among other items, the one or more databases 132 can store files tracking information, customer profile information, location information, data or image files for display via the electronic shelf display strips 140A-N, etc. As shown, the one or more databases 132 are included, wholly or partially, within the electronic shelf host system 130. However, in some embodiments, the one or more databases 132 can be one or more discrete components. Additionally, the one or more databases 132 and/or the electronic shelf host system 130 may be physically and/or functionally distributed.

As discussed, the one or more databases 132 may be communicatively coupled to the electronic shelf host system 130 and configured to store various content, software, descriptive data, images, system information, drivers, and/or any other data item or file utilized by other components of an electronic shelf platform 120. The one or more databases 132 may be managed by a database management system (DBMS), for example but not limited to, Oracle, DB2, Microsoft Access, Microsoft SQL Server, PostgreSQL, MySQL, FileMaker, etc. The one or more databases 132 can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

Figure 2:
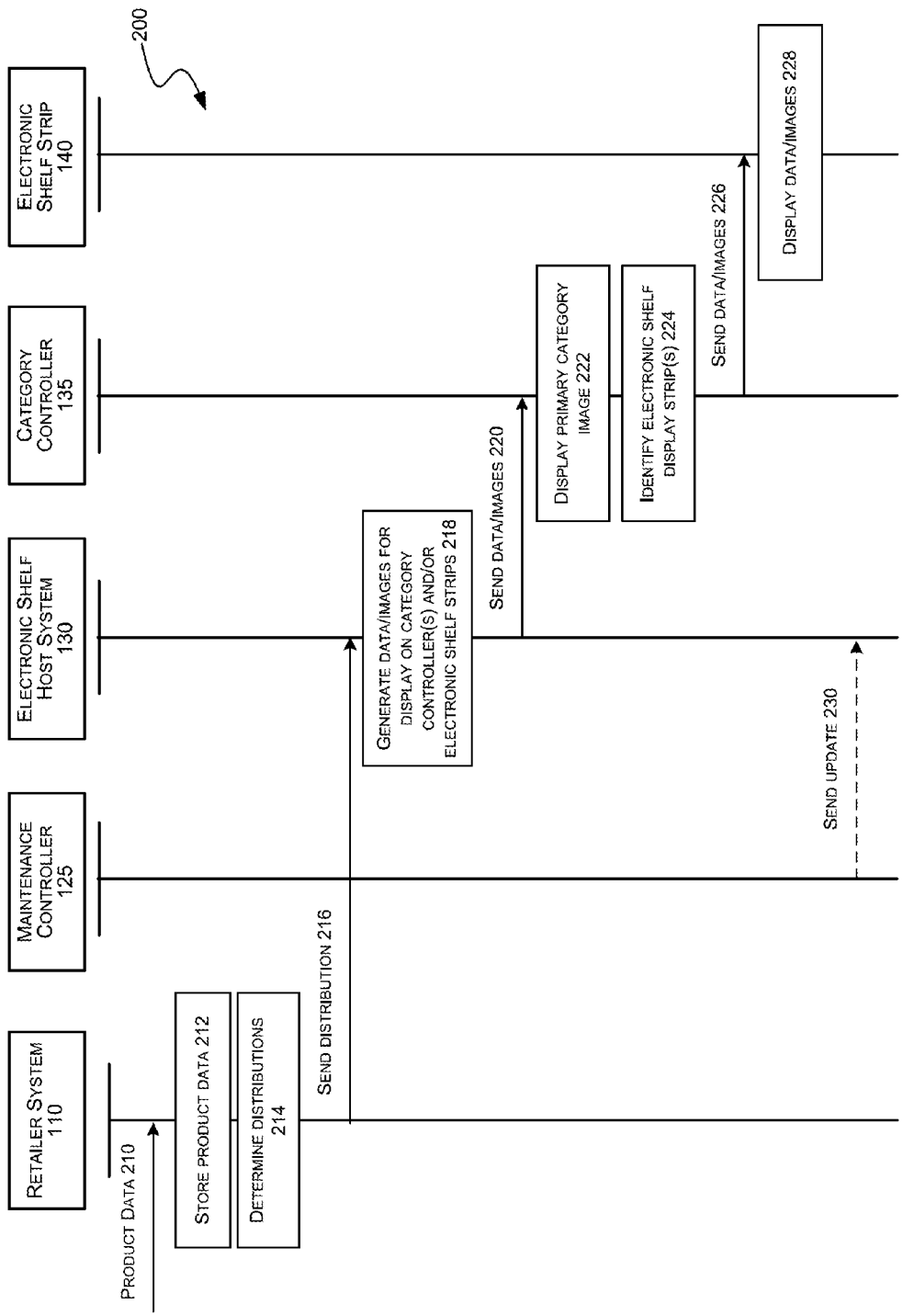
FIG. 2 depicts a sequence diagram illustrating an example process of the automated customer location-based shelf display technologies described herein.

FIG. 2 depicts a sequence diagram illustrating an example process 200 of the automated customer location-based shelf display technologies described herein. The example process 200 is described with reference to various components of environment 100 of FIG. 1, although other configurations are possible.

As discussed, most large retailers use a headquarters-based retailer system such as, for example, retailer system 110 which includes a central repository 112 of product (or item) data. At step 210, the retailer system 110 receives product data (or updates to product data). The product data can include, among other things, pricing data for items, product description data, and product space (or placement) data. The product description data can include any information descriptive of a product such as, for example, package size information, serving size information, place of origin, etc. The product space data can include information about placement of the product at the retail store or location. In some embodiments, the product data can be received manually through data entry techniques by an administrator or manager with access to the retailer system 110. Alternatively or additionally, the data may be received in whole or in part via one or more input files. At step 212, the retailer system 110 stores the product data in the central repository 112.

At step 214, the retailer system 110 determines the store or stores that should receive product data distributions (or updates) and, at step 216, sends the product data distributions to the appropriate electronic shelf host system(s) 130 at the appropriate store or stores. In some embodiments, the product data distribution can be sent by the retailer system 110 to the electronic shelf host system 130 responsive to receiving and/or storing the product data. Alternatively or additionally, the product data distribution can be sent on a periodic basis (e.g., hourly, daily, or weekly batch) based on a pre-determined trigger or in any other manner known in the art. In some embodiments, the product data distributions are initiated by the retailers system 110. In other embodiments, the product data distributions are alternatively or additionally retrieved and/or otherwise requested by an electronic shelf host system 130.

The product data distributions can conform to any necessary legal requirements and/or standards. For example, the product data distributions can conform to any legal requirements in states and/or cities in North America and globally that require price per measure/units on price labels, etc. Additionally, the product data distributions can conform to standards from the National Retail Foundation (nrf.com) for the systems that communicate the distribution information and match it up with available point-of-sale (POS) system commands. In some embodiments, the same system (e.g., the electronic shelf host system 130) retrieves all of the POS transactions in a transaction log (T-Log) nightly or, in the worst case, weekly. Additionally, a system can allow a Supervisor or Administrator under password control to enter individual price changes at the store level via commands entered into the POS system.

As described herein, the retailer system 110 is located at the retailer headquarters and is integrated into and/or otherwise in communication with the existing price and product systems (e.g., master item databases). Additionally, although not shown, a separate merchandising system for space management can be used to create plan-o-grams for each shelf of the stores and/or otherwise organize how the products will be laid out at the stores. The merchandising system for space management takes into account the locations of items via Stock Keeping Units (SKUs). For example, the merchandising system can determine where a product or item is to be placed on a shelf or in a cooler, freezer, etc. for each and every store. Additionally, the merchandising system can determine facing information, including indications of which part (or end) of a product or item should be front facing and how many of the products' faces should face the consumer. This information can be exact in that, for example, the summed widths of each package's face displayed on a particular 48-inch wide shelf total 48 inches.

In some embodiments, the retailer system 110 integrates with the space management system to obtain exact measurements for each SKU that resides on a particular shelf within a category. As changes are made to the prices, typically through a merchandising system for promotions, these price changes are monitored by the retailer system 110 and sent to the particular store(s) to update the corresponding electronic shelf system(s).

At step 218, the electronic shelf host system 130 generates data or images for display on the various category controllers and/or the electronic shelf strips in communication with the corresponding category controller(s). As discussed above, each electronic shelf strip can be in communication with multiple proximate electronic shelf strips comprising a subset of the total electronic shelf display strips of the electronic shelf platform (or store premises). In the case of product additions and/or updates, it is appreciated that not all category controllers will receive updated data and/or image files. At step 220, the electronic shelf host system 130 sends the one or more of the category controller(s) the appropriate data or images for display on the particular category controller(s) and/or the various electronic shelf strips in communication with those controllers.

At step 222, a category controller 135 displays a primary category image on the output screen and, at step 224, identifies one or more electronic shelf display strips that need to display the newly received images. As discussed herein, the first category image can, for example, request that a user enter particular preferences. Alternatively or additionally, the primary category image can display coupons, advertisements, and/or special offers. An example of the first category image is shown and discussed in greater detail with reference to FIG. 6.

At step 226, the category controller 135 generates appropriate images from the data received from the electronic shelf host system 130, if necessary, and sends the images to the appropriate electronic shelf strips and/or otherwise directs the one or more electronic shelf display strips to display the images. As discussed above, the category controller 135 is typically in communication with multiple adjacent electronic shelf display strips and directs and/or otherwise controls what the adjacent electronic shelf display strips display to the customers. At step 228, the electronic shelf strip or strips 140 display the received data/images.

At step 230, the maintenance controller 125 optionally sends a distribution update 230. As discussed in more detail with reference to FIG. 1, the maintenance controller can provide store-level controls made available to managers and/or supervisors for store-specific special offers. The store-specific special offers can include, but are not limited to, various specials where the prices of products or items can be discounted. Discounts can be based on a time of day. Alternatively or additionally, discounts can be based on specific instances in which the store has perishables such as bakery items, pre-made dishes, seafood, produce, meat, dairy, cheese, flowers, etc., that will have to be thrown out within a period of time (e.g., next day). The maintenance controller can be a tablet computer (e.g., Apple iPad or Android tablet) configured to allow price updates at the store level.

In some embodiments, the maintenance controller 125 is password-protected and logged such that if a grocery store wants to run a special in a category or have time-of-day pricing such as "Singles night 7-9 PM Tuesday, all drink mixes 10% off," or "Seniors 5% off all Wednesday in center aisles," the maintenance controller can send an update and/or instructions to change the displays on the applicable category controllers in the applicable areas as well as the corresponding electronic shelf display strips images (e.g., price and unit price). In another example, bananas may go on sale when it appears to the produce personnel that they are likely to be thrown out soon. In some embodiments, each department (e.g., Bakery, Meat, Deli, Dairy, Seafood, etc.) would have a maintenance controller or access to a maintenance controller. In some embodiments, stable shelf goods may require higher level permission and perishable goods a lower permission.

Although not shown in the example of FIG. 2, in some embodiments, the maintenance controller 125 can perform the same process by using the retailer system 110 by first sending the update to the retailer and then allowing the retailer to send the information included in the appropriate (e.g., next) distribution.

Additionally, the system can account for potential pricing inconsistencies in a variety of ways. For example, a consumer may take an item off the shelf at 8:45 PM during a "Blue Light" special that is set to end at 9:00 PM. In some embodiments, the system can determine what the price was when the user was at the shelf based on tracking data. Alternatively, the system may be configured to give the customer the lowest possible price during his or her shopping trip. For example, if the user arrived at 7:45 PM as determined based on login or sign-in and pulled the item off the shelf prior to an 8:01 PM checkout, then the system may give the customer the discount, even if the discount started at 8:00 PM and the price of that particular product is likely lower than the price displayed to the customer when the customer pulled the item off the shelf.

Figure 3:
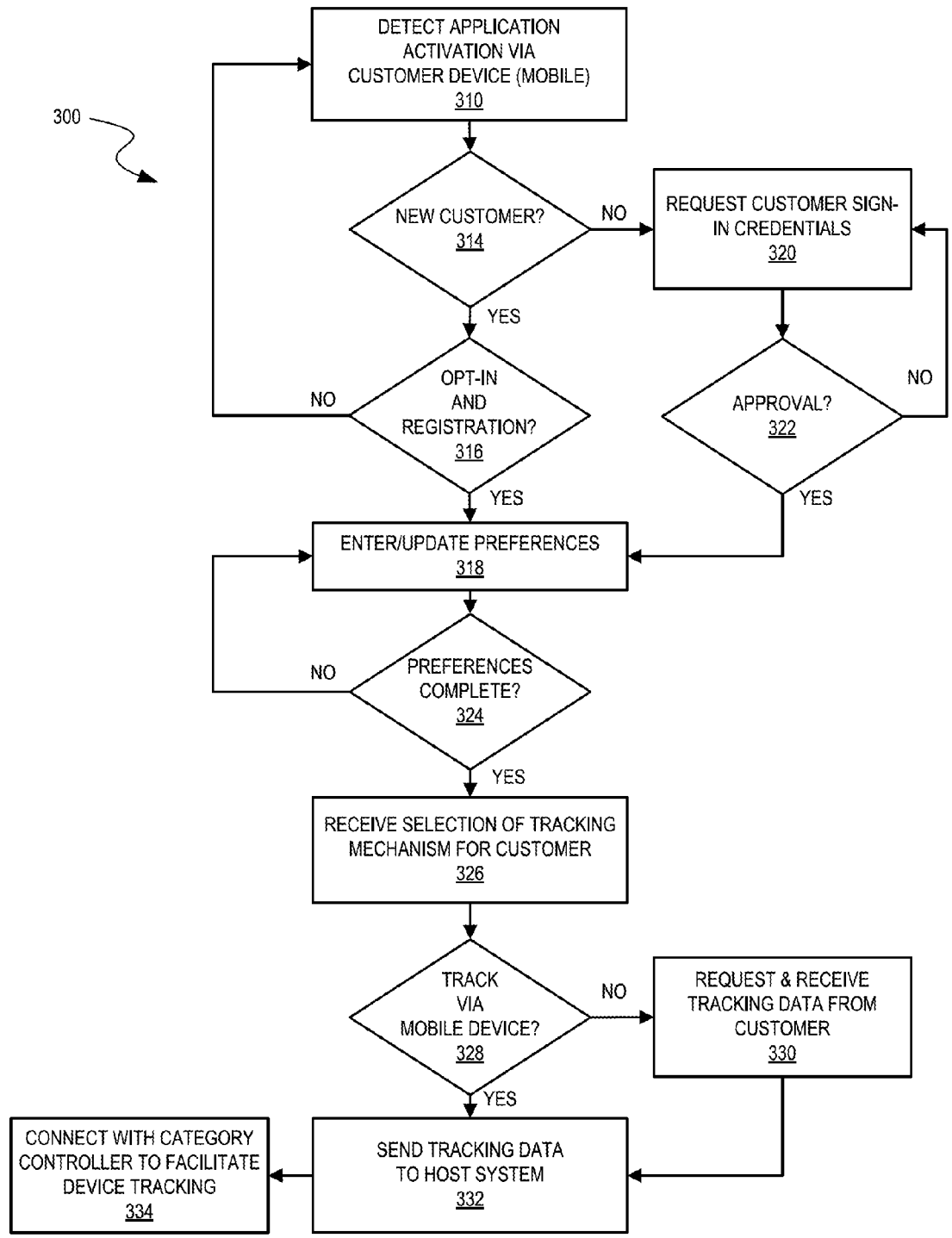
FIG. 3 is a data flow diagram depicting an example customer initialization process illustrating initialization of a customer with an electronic shelf host system via a mobile device.

FIG. 3 is a data flow diagram depicting an example customer initialization process 300 illustrating initialization of a customer with an electronic shelf host system via a mobile device, according to an embodiment. A mobile device such as, for example, one of mobile devices 142A-N of FIG. 1 can, among other functions, perform the example process 300.

To begin, a customer downloads and/or otherwise accesses and installs a mobile device application on his or her mobile device. Once installed, at process 310, the mobile device detects that the application has been activated. For example, the customer can activate the application by selecting an icon associated with the mobile device application on a touchscreen of the mobile device.

At decision 314, the mobile device determines if the customer is a new customer. If so, the customer is prompted to opt-in and/or register. At decision 316, the mobile device determines if the opt-in and/or registration process is complete. If so, at process 318, the mobile device prompts the customer to provide or update preference information. For example, if the customer is not a new customer, the mobile device can access the customer's profile and modify any existing preferences.

If the customer is not a new customer (e.g., the customer has previously opted-in and/or registered with the system), then, at step 320, the mobile device requests customer sign-in or login credentials. The credentials can be sent to the electronic shelf host system for approval. At decision 322, the mobile device determines if approval is received from the electronic host system (or other authentication system). Once approved, the process continues at process 318.

At decision 324, the mobile device determines if the customer has finished providing and/or otherwise entering preferences. As discussed herein, the preferences can be sent to the electronic shelf host system and saved in a customer profile for future visits ensuring that the customer does not have to enter his or her preferences on every visit to the store.

At process 326, the mobile device receives a selection of a tracking mechanism for the customer. For example, the customer selection can identify the customer trackable device. As described herein, the customer trackable devices can include, among other possible devices, the customer's mobile device or carts or baskets provided by the merchant that have embedded and/or otherwise attached tracking technology (e.g., RFID, Bluetooth, ZigBee, etc.) to facilitate the tracking. In some embodiments, the tracking technology embedded and/or otherwise attached to the carts or baskets can be very low power or passive devices.

At decision 328, the mobile device determines if the mobile device itself is selected. If so, indication of such is sent to the electronic shelf host system at process 332. Otherwise, the mobile device requests and receives customer tracking data from the customer and provides this tracking data at process 330. Requesting the tracking data can, for example, include requesting and receiving a unique cart or basket identifier from the customer. The cart and/or basket identifiers may be placed anywhere on the carts and/or baskets such that they are visible to the customers.

Lastly, at process 334, the mobile device connects with a category controller responsive to the category controller attempting to establish communication. As discussed herein, the category controller can attempt to connect with the trackable devices when they are proximate to the category controller.

Figure 4:
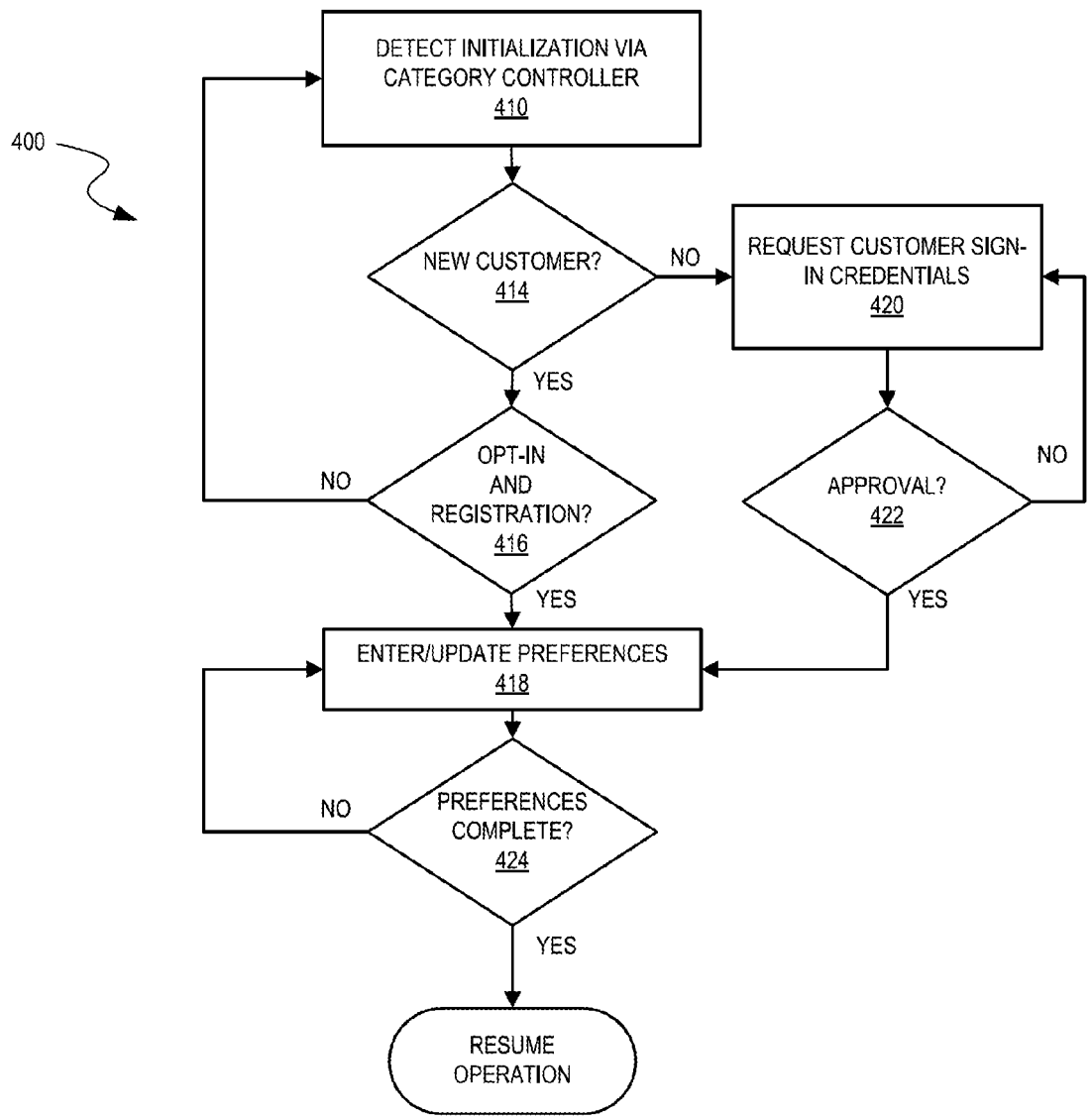
FIG. 4 is a data flow diagram depicting an example customer initialization process illustrating initialization of a customer with an electronic shelf host system via a category controller.

FIG. 4 is a data flow diagram depicting an example customer initialization process 400 illustrating initialization of a customer with an electronic shelf host system via a category controller, according to an embodiment. A category controller such as, for example, one of category controllers 135A-N of FIG. 1 can, among other functions, perform the example process 400.

To begin, at process 410, the category controller detects that a customer has requested initialization via the category controller. For example, the customer can activate initialization by selecting an icon on a touchscreen of the category controller. Processes 414-424 are similar to processes 314-324 of FIG. 3 with the exception that the processes are performed by the category controller. Once the customer indicates that preferences are complete, at process 424, the category controller can resume normal operation as described herein (e.g., displaying advertisements preferences, tracking customers, and/or driving the electronic shelf display strips).

Figure 5:
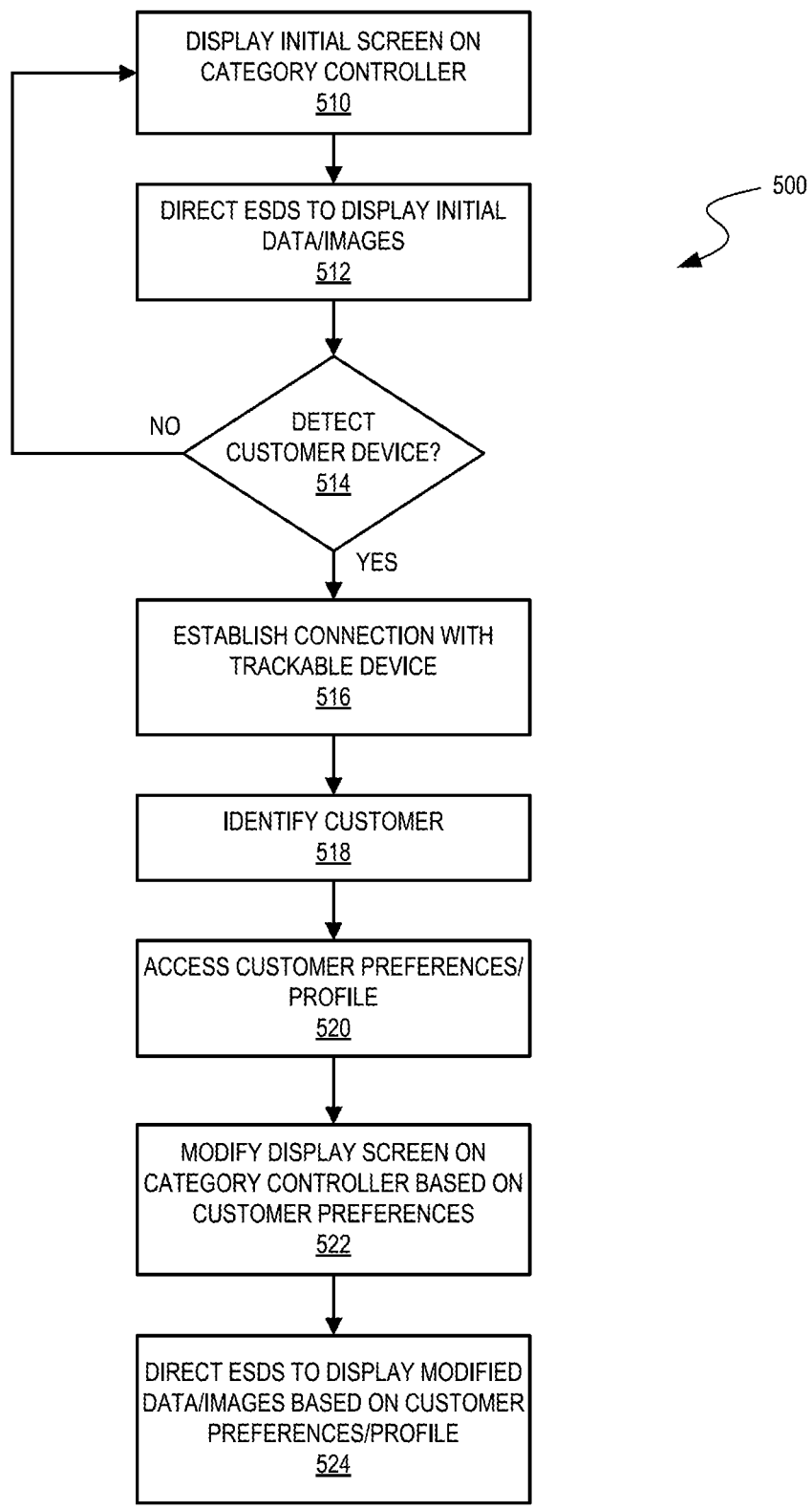
FIG. 5 is a data flow diagram depicting an example process 500 illustrating operation of a category controller.

FIG. 5 is a data flow diagram depicting an example process 500 illustrating operation of a category controller, according to an embodiment. More specifically, process 500 illustrates an example of the described automated customer-based shelf display technologies wherein the category controller identifies a proximate customer, responsively modifies its display (data/images) and drives the adjacent electronic shelf display strips to modify their displays based on the customer. A category controller such as, for example, one of category controllers 135A-N of FIG. 1 can, among other functions, perform the example process 500.

To begin, at process 510, the category controller displays an initial screen on the output display of the category controller. For example, the category controller can display basic advertisements (i.e., not based on a particular customer), an informational screen about proximate products or items, etc. In some embodiments, the initial or default screen that is output on the display of the category controller is determined based on information and/or data/images received from the electronic shelf host system (e.g., in-store server). Likewise, at process 512, the category controller directs one or more electronic shelf display strips to display initial data/images. Again, the initial data/images can be basic non-customer specific information (e.g., pricing information) determined based on the information received from the electronic shelf host system.

At decision 514, the category controller detects a customer trackable device. As discussed herein, the customer trackable devices can be the customer's mobile device and/or carts or baskets that include tags and/or other embedded or attached electronics or materials to facilitate tracking. If a customer is not detected, then the category controller continues displaying the initial screens and/or data/images. However, if a customer is detected, at process 516, the category controller establishes a connection with the trackable device.

At process 518, the category controller identifies the customer. In some embodiments, in order to identify the customer, the category controller can collect the identifier of the trackable device and request the preference/profile information from the electronic shelf host system. The electronic shelf host system stores this information in one or more databases such as, for example, database(s) 132 of FIG. 1. At process 520, the category controller accesses the customer preferences profile information and processes the information to determine which changes, if any, need to be made to the display of the category controller and/or directed to one or more of the electronic shelf display strips under the control of the particular category controller.

Once the appropriate screens and/or images/data is determined, at processes 522 and 524, the category controller modifies the display screen on the category controller and directs the one or more electronic shelf display strips to modify its display (e.g., data/images), respectively, based on the customer preferences/profile information. In some embodiments, a timer may be set such that the screen and/or the electronic shelf display strips revert to the initial screen or data/images after a pre-determined period of time (e.g., thirty seconds, a minute, or more).

Figure 6:
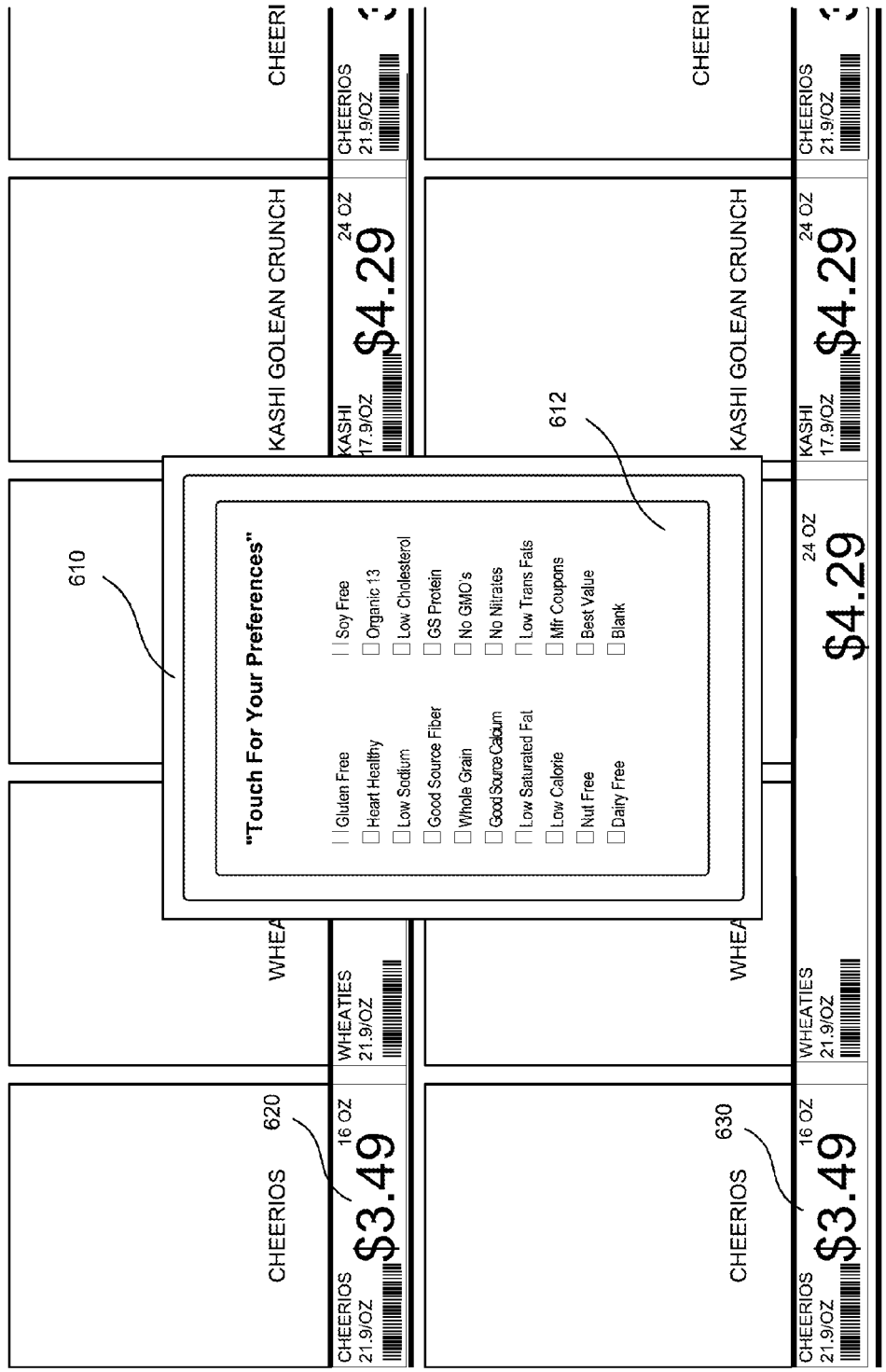
FIG. 6 illustrates an example category controller on a store shelf containing various products or items.

FIG. 6 illustrates an example category controller 610 on a store shelf containing various cereal boxes. The category controller 610 directs the electronic shelf display strips 620 and 630 to display various images. As shown in the example of FIG. 6, various cereal pricing and price per unit information is displayed. The touch screen 612 of the category controller 610 includes a message to customer to "Touch For Your Preferences," and includes various check boxes for the user to select and/or deselect preferences.

In some embodiments, when the customer is done selecting preferences, the consumer can touch a "show me" box and the category controller can direct the electronic shelf display strips to display only those items which meet the consumer preferences. Alternatively, those items which meet the consumer preferences will be highlighted to the consumer (e.g., via color changes, flashing, special characters, etc.).

As illustrated in the example of FIG. 6, two identical Wheaties facings have a single price and bar code across both facings. As discussed herein, the information on how many facing share a bar code (or information display) is based on a plan-o-gram which contains the facing information including how many facings of any product corresponds to which bar codes, etc. Again, the plan-o-gram is automatically maintainable and/or updateable. For example, it is common for plan-o-grams to change fairly often so that new products can be inserted and older ones deleted from a category. In some embodiments, the system provides a very substantial benefit to retailers by maintaining shelf integrity since the retail personnel reordering product do not move adjacent products over to cover a space and then lose track of what they need to do to maintain the shelf set of the approved plan-o-gram.

Figure 7:
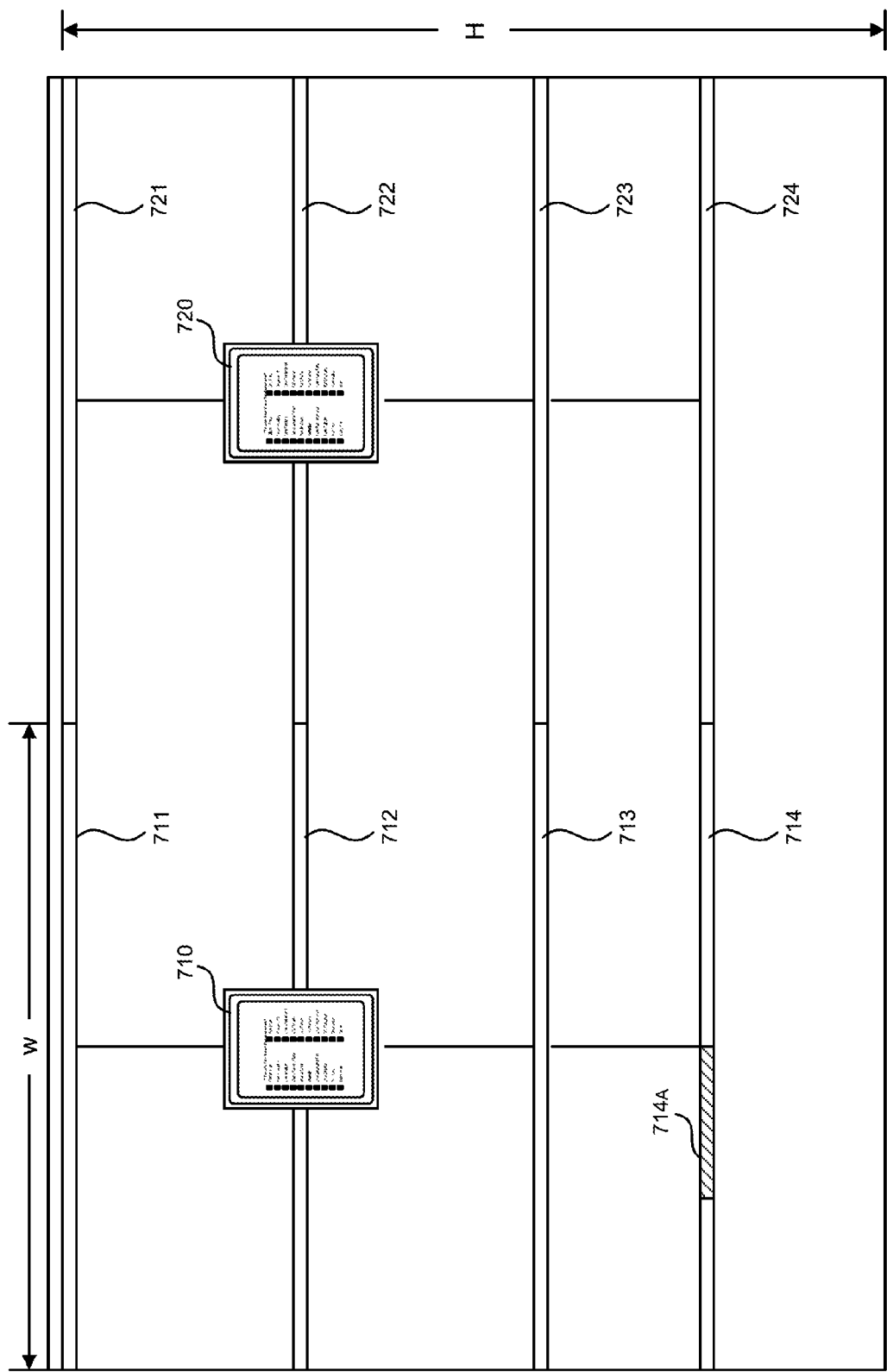
FIG. 7 illustrates example store shelving having category controllers directing electronic shelf display strips.

FIG. 7 illustrates example store shelving having category controllers 710 and 720 directing electronic shelf display strips 711-714 and 721-724, respectively. In the example of FIG. 7, a section 714A of the electronic shelf display strip 714 is shown highlighting customer preferences.

As discussed herein, the category controller 710 receives and/or generates images (pixels) for the electronic shelf display strips 711-714. As shown, the electronic shelf display strips are each approximately 48"×1-1.25". The category controller 710 may have as many as 10,000 or more images for each electronic shelf display strip for transmission via a wired or wireless connection using ZigBee, BlueTooth, etc., which can be embedded within the category display. The images can be received from the electronic shelf host system 130 as they are generated, on an as-needed basis, or in any other matter. As discussed herein, the category controllers 710 and 720 can communicate with the electronic shelf host system 130 via wired or wireless (e.g., Wi-Fi) communication.

In some embodiments, the electronic shelf display strips are designed to fit in typical shelving unit of width W and height H. As discussed, the electronic shelf display strips themselves can be approximately 48" wide and 1-1.25" in height although alternative widths and heights are possible.

Figure 8:
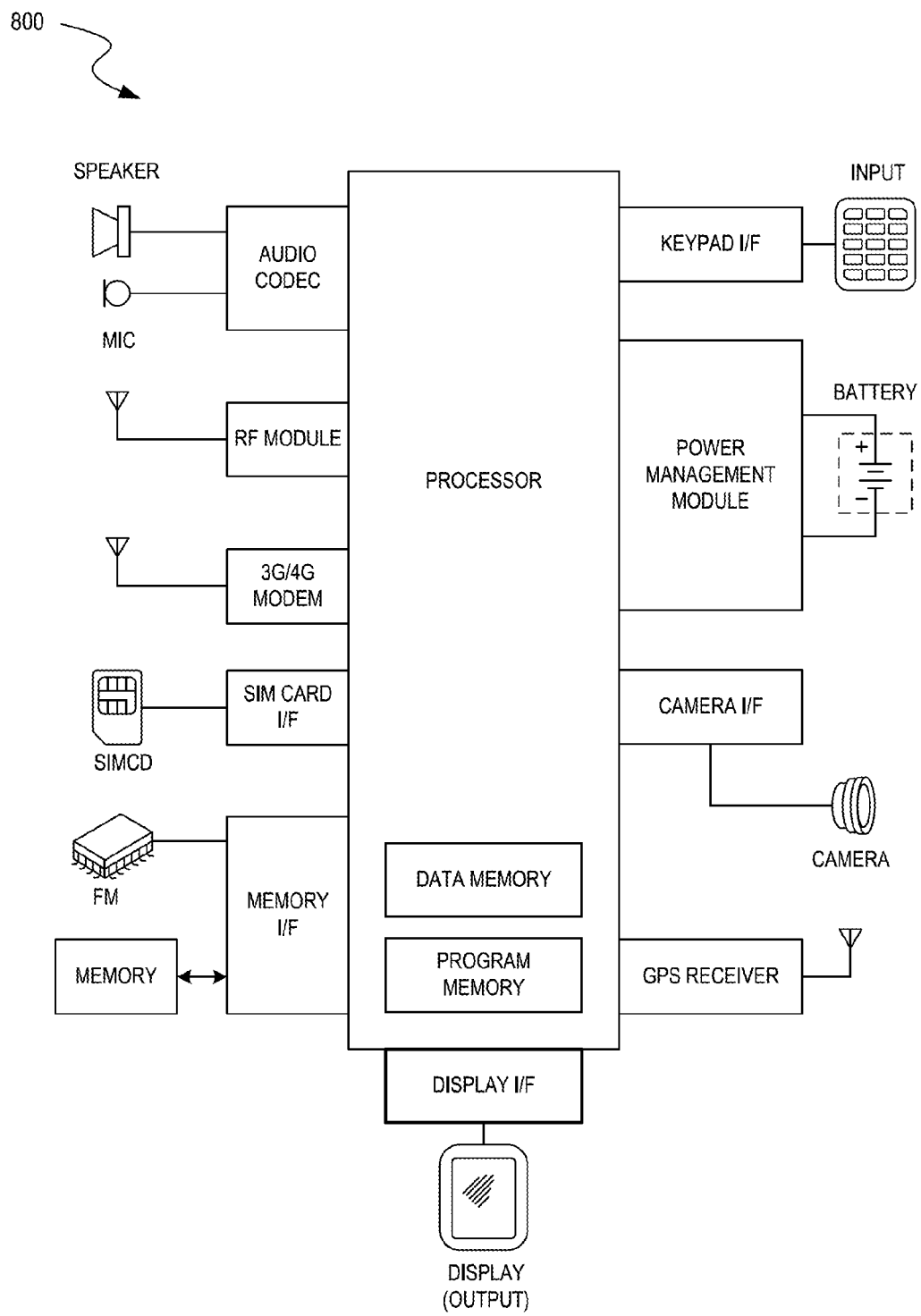
FIG. 8 depicts a block diagram illustrating example components of a representative mobile device or tablet computer (e.g., category controller, maintenance controller, etc.) in the form of a mobile (or smart) phone or tablet computer device.

FIG. 8 depicts a block diagram illustrating example components of a representative mobile device or tablet computer (e.g., category controller, maintenance controller, etc.) 800 in the form of a mobile (or smart) phone or tablet computer device. Various interfaces and modules are shown with reference to FIG. 8, however, the mobile device or tablet computer does not require all of modules or functions for performing the functionality described herein. In is appreciated that in many embodiments various components are not included and/or necessary for operation of the category controller. For example, components such as GPS radios, cellular radios, and accelerometers may not be included in the controllers to reduce costs and/or complexity. Additionally, components such as ZigBee radios and RFID transceivers, along with antennas, can populate the Printed Circuit Board.

Figure 9:
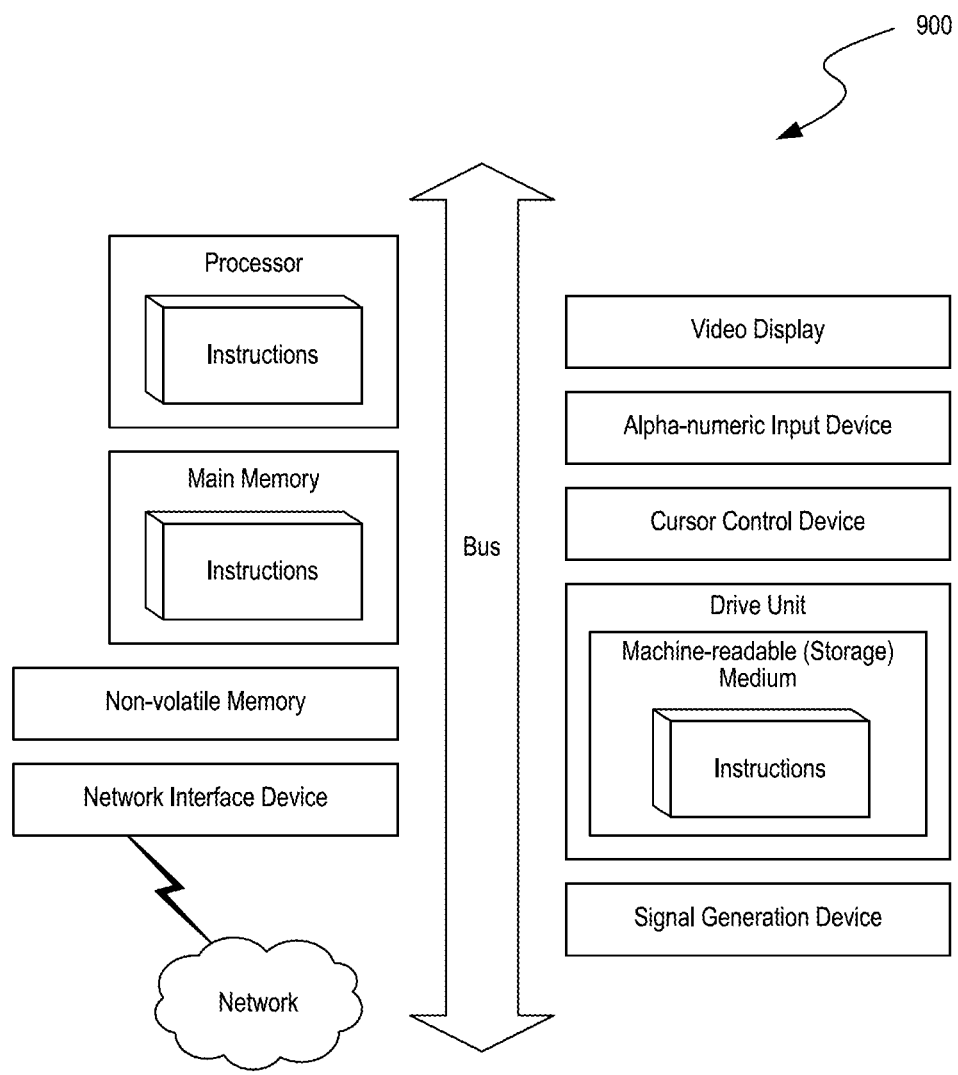
FIG. 9 is a diagrammatic representation of a machine in the example form of a computer system within which a set of instructions, for causing the machine to perform any one or more of the methodologies discussed herein, may be executed.

FIG. 9 depicts a diagrammatic representation of a machine, in the example form, of a computer system 900 within which a set of instructions, for causing the machine to perform any one or more of the methodologies discussed herein, may be executed. The computer system 900 can be representative of any computer system, server, etc., described herein.

In the example of FIG. 9, the computer system 900 includes a processor, memory, non-volatile memory, and an interface device. Various common components (e.g., cache memory) are omitted for illustrative simplicity. The computer system 900 is intended to illustrate a hardware device on which any of the components depicted in the example of FIG. 1 (and any other components described in this specification) can be implemented. The computer system 900 can be of any applicable known or convenient type. The components of the computer system 900 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 900. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 9 reside in the interface.

In operation, the computer system 900 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer, and when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

What is claimed is:

1. A system comprising:
a host server in communication with a central retailer system over a first communication link, the host server configured to:
 receive product data distributions from the central retailer system; and
 process the product data to generate various images for displaying the product data to customers;
multiple electronic shelf display strips,
 wherein each electronic shelf display strip includes an elongated backplane and an elongated electronic display on the elongated backplane,
 wherein the elongated backplane and the electronic display are flexible for fitting into existing store shelf pricing areas, and
 wherein the elongated backplane and the electronic display are configured to extend along shelf space for displaying multiple different products available for purchase by consumers; and
multiple category controllers, each category controller in communication with the host server over second communication links and at least some of the multiple electronic shelf display strips proximate to the category controller over third communication links,
 wherein each category controller receives product price data and product position data from the host server, the product price data corresponding to pricing information related to multiple different products available for purchase on one or more shelves associated with one of the electronic shelf display strips, and the product position data corresponding to locations of the multiple different products on the one or more shelves associated with one of the electronic shelf display strips, wherein each category controller drives the electronic shelf display strips to display the product price over the third communication link, wherein the product price data is displayed on the electronic shelf display strips such that product price data aligns with the multiple different products on the one or more shelves according to the product placement data, wherein each category controller is configured to communicate with proximate mobile devices associated with customers over a fourth communication link, wherein each category controller is configured to track proximate trackable devices, wherein each category controller is configured to identify a customer based on the proximate trackable device and access preferences associated with the customer, and wherein each category controller is configured to drive the multiple electronic shelf display strips to display images over the third communication link based on the preferences associated with the customer.

2. The system of claim 1, wherein the each of the multiple electronic shelf strips comprises:
a digital image interface disposed on the elongated backplane,
wherein the digital image interface is configured to receive data images from at least one of the category controllers.

3. The system of claim 1, wherein one or more of the trackable devices comprises one of the mobile devices associated with the customers.

4. The system of claim 1, wherein the trackable devices comprise carts or baskets associated with the customers, wherein the carts or baskets include tags to facilitate the tracking.

5. The system of claim 4, wherein the carts or baskets include a tag identifier that is provided to the category controller by the customer via a mobile device.

6. The system of claim 4, wherein the carts or baskets include a tag identifier that is provided to the category controller by the customer via the display of the category controller.

7. The system of claim 1, wherein the host server is further configured to:
identify one or more category controllers corresponding to the various images for displaying the product data to customers; and
send the various images to the identified category controllers.

8. The system of claim 1, wherein one or more category controllers dynamically drive standalone electronic shelf display strips in a free-standing or temporary area.

9. The system of claim 8, wherein the free-standing or temporary area is designed without typical shelving.

10. The system of claim 1 wherein:
the host server is configured to receive changes to product price data and product position data; and
the electronic shelf display strips are configured to receive updated product price data and updated product position data from the host server and display the updated product price and position data via the electronic display.

11. The system of claim 1 wherein:
at least one of the category controllers and/or the electronic shelf display strips is configured to identify a unique customer via proximity information of a mobile device associated with the unique customer; and
at least one of the electronic shelf display strips identified as proximate to the unique customer based on the proximity information is configured to display only information associated with the unique customer.

12. The system of claim 1 wherein:
at least one of the category controllers and/or the electronic shelf display strips is configured to detect customer delay times in front of specific portions of the electronic shelf display strips based on proximity information of mobile devices associated with customers; and
the host server is configured to receive the customer delay times and data indicating portions of the electronic display strips associated with the customer delay times.

13. The system of claim 1 wherein:
the electronic shelf display strips are configured to receive a specific product request from one of the category controllers proximate to the electronic shelf display strips and/or the mobile device of a unique consumer; and
at least one of the electronic shelf display strips proximate to a specific product associated with the specific product request is configured to display only information related to the specific product request.

14. A method comprising:
processing, by a processor of a category controller, images received from a host server to identify a first image for display on an output display of the category controller and a first set of images for display on multiple electronic shelf display strips,
wherein the first set of images includes product price data and is associated with product position data, the product price data corresponding to pricing information related to multiple different products available for purchase on one or more shelves associated with one of the electronic shelf display strips, and the product position data corresponding to locations of the multiple different products on the one or more shelves associated with one of the electronic shelf display strips;
displaying the first image on the output display of the category controller;
driving the multiple electronic shelf display strips to display the first set of images such that the product price data aligns with the multiple different products on the one or more shelves according to the product placement data,
wherein the electronic shelf display strips are configured to extend along shelf space for displaying multiple different products available for purchase by consumers;
detecting a proximate trackable device wirelessly and responsively establishing a connection with the trackable device;
identifying a customer associated with the trackable device and accessing preferences associated with the customer;
processing, by a processor of the category controller, images received from the host server to identify a second set of images for display on the multiple electronic shelf display strips based on the preferences associated with the customer;

driving the multiple electronic shelf display strips to display the second set of images.

15. A non-transitory computer readable medium having instructions stored thereon that when executed by one or more processors of a category controller, cause the category controller to:

process images received from a host server to identify a first image for display on an output display of the category controller and a first set of images for display on multiple electronic shelf display strips, wherein the first set of images includes product data and is associated with product position data, the product data corresponding to information related to multiple different products positioned on one or more shelves associated with one of the electronic shelf display strips, and the product position data corresponding to locations of the multiple different products on the one or more shelves associated with one of the electronic shelf display strips;

display the first image on the output display of the category controller;

drive the multiple electronic shelf display strips to display the first set of images such that the product data aligns with the multiple different products on the one or more shelves according to the product placement data, wherein the electronic shelf display strips are configured to extend along shelf space for displaying multiple different products;

detect a proximate trackable device wirelessly and responsively establish a connection with the trackable device;

identify a customer associated with the trackable device and access preferences associated with the customer;

process images received from the host server to identify a second image for display on the output display of the category controller and a second set of images for display on multiple electronic shelf display strips based on the preferences associated with the customer;

display the second image on the output display of the category controller;

drive the multiple electronic shelf display strips to display the second set of images.

* * * * *